July 4, 1939.  R. A. GARVERICK  2,164,911
VALVE CONSTRUCTION
Filed Dec. 2, 1937
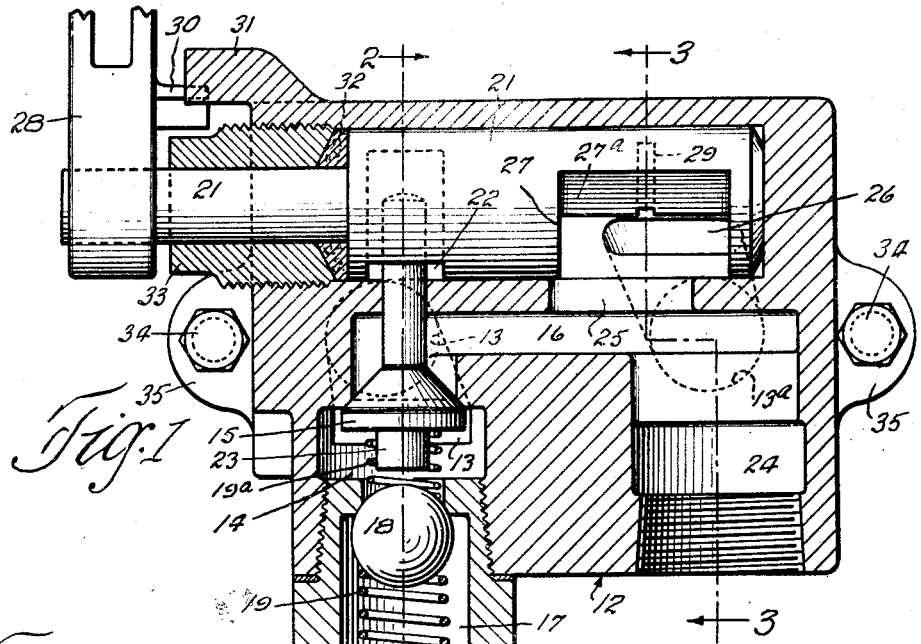
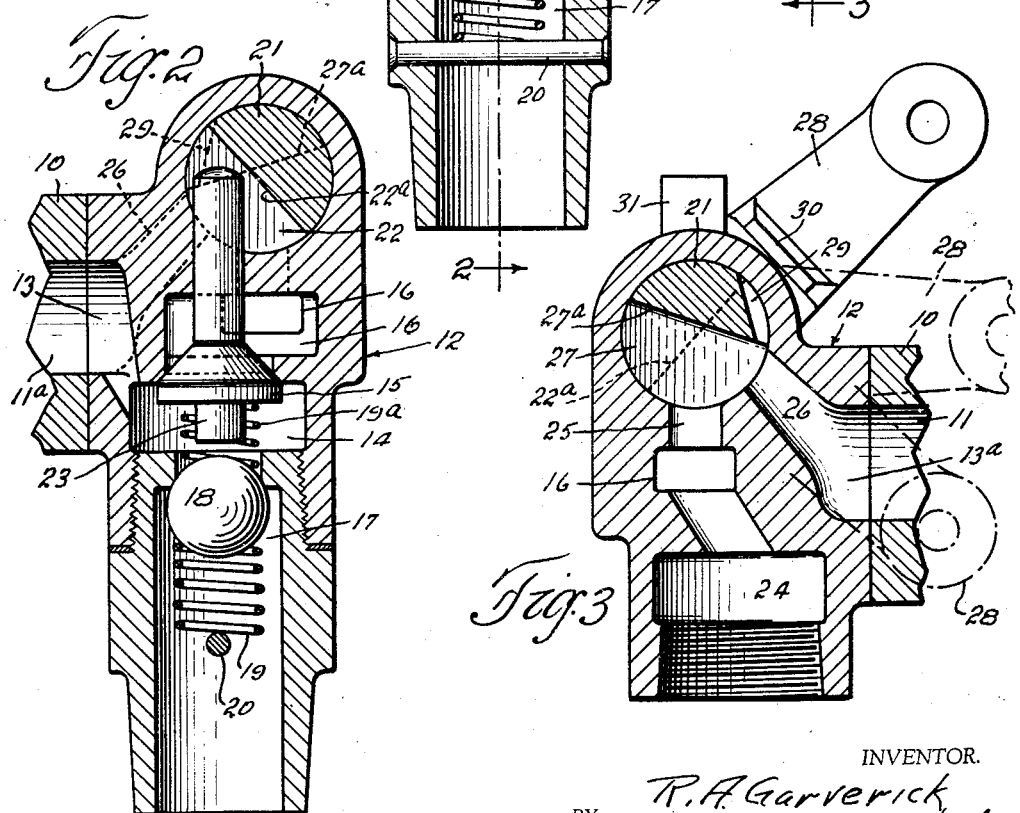
INVENTOR.
R. A. Garverick
BY Hull Brock swest
ATTORNEY.

Patented July 4, 1939

2,164,911

UNITED STATES PATENT OFFICE 2,164,911

VALVE CONSTRUCTION

Ralph A. Garverick, Marion, Ohio, assignor to The Marion Metal Products Company, Marion, Ohio, a corporation of Ohio Application December 2, 1937, Serial No. 177,735

6 Claims. (Cl. 121—46.4)

This invention relates to a valve construction and particularly to one designed for use in connection with a hydraulic lift such as is used for dump trucks and the like, where a pump driven by a vehicle motor operates a piston within a cylinder for the purpose of operating the hoist.

The principal object of the invention is to provide a novel and improved valve construction of such character that while running the pump continuously, by operation of the valve control, the hoist may be elevated, held in elevated position, or lowered, and the pump deprived of all but a small quantity of fluid while idling—that is, while the hoist is sustained in elevated position, or is being lowered. This latter is important when fluid, such as oil is employed, as it has been found by experience that prolonged rapid circulation of a large body of oil under the circumstances mentioned results in the temperature of the oil becoming so highly elevated that it overheats and adversely affects the operation of the pump and becomes so thin that it leaks freely past the piston of the hoist.

A still further object is to accomplish the foregoing by a simple and inexpensive structure embodying a double valve arrangement with means for controlling one of the valve elements independently of the other, and for operating both such elements together.

Other and more limited objects will be in part apparent and in part pointed out hereinafter in connection with the accompanying drawing wherein Fig. 1 is a central sectional view taken through a valve construction embodying the invention; Fig. 2 is a section corresponding to the line 2—2 of Fig. 1 and Fig. 3 is a section corresponding to the line 3—3 of Fig. 1.

In the drawing the numeral 10 indicates a fragment of a pump which may be of any conventional construction and having inlet and outlet openings 11 and 11a terminating in a face of the pump body adapted to be brought into contact with a complementary face of the valve body 12 having inlet and outlet openings 13 and 13a registering respectively with the pump outlet and inlet openings 11a and 11.

The inlet opening or passage 13 of the valve body 12 extends to and communicates with a passage portion 14 provided for reception of a poppet valve 15. The valve 15 closes the communication between the passage portion 14 and a longitudinal passage 16. Communicating with the passage portion 14 is a shouldered passage portion 17 the communication of which with the passage portion 14 is closed by a ball type check valve 18 urged into closed position by a spring 19 compressed between the same and a pin 20. The poppet valve 15 is provided with a stem extending upwardly into a cylindrical bore in the valve body 12 in which is rotatably mounted an operating element or rotor 21 in which is formed a notch 22 receiving the stem of the valve 15 and adapted, upon rotation counterclockwise, as seen in Fig. 2, to open the valve 15. It should be noted that when the element 21 is rotated, it will first open the valve 15 and upon further rotation, will cause the projection 23 on the valve 15 to engage the ball check 18 and open communication between the passage portions 14 and 17. The passage portion 16 communicates through the valves 15 and 18 with the passage portion 17 which constitutes the outlet for fluid from the valve body for the purpose of supplying power to elevate the hoist. The passage portion 16 also communicates with the fluid inlet of the passage portion 24 which constitutes a return for fluid from the hoist when the passage 17 is supplying fluid to the hoist. The portion 16 also communicates through an opening 25 to the interior of the bore which receives the rotor 21 and thence with a passage portion 26 to the opening 13a which is in registration with the pump inlet 11. Communication between the passages 25 and 26 is controlled by the rotor 21, a portion of which forms a cut-off valve, communication being established through a notch 27 in the rotor 21 until the control arm 28 is moved to approximately the mid position as indicated in dot and dash lines in Fig. 3, after which communication is solely through the smaller notch 29 which remains open even when the arm 28 has been rotated clockwise as seen in Fig. 3 to the extreme down position, indicated by dot and dash lines. The motion of the arm 28 is limited by a projection 30 moving between a stop 31 and a wall of the valve body. The bore receiving the rotor 21 may be sealed by suitable packing 32 held in place by packing nut 33. The pump body and the valve body may be held in proper relation to each other by means of bolts 34 passing through the ears 35 and clamping suitable gasket means between the two bodies.

Operation

In operation, when it is desired to elevate the hoist, the pump is set in motion and the valve mechanism is adjusted to the position shown in the drawing with the result that fluid, preferably oil, enters the passage 13 and flows from there into the passage portion 14 and opens the ball check 18 against the pressure of the spring 19 at the same time seating the poppet valve 15 more firmly than it is normally held by spring 19a. This results in unseating the ball check 18 and forcing the fluid into one end of a cylinder on one side of the piston therein which operates the hoist. Fluid from the other side of the piston in said cylinder is thereby caused to enter the passage 24 and passes from there into the passage 16, through the opening 25 and notch 27 into the passage 26 and back to the pump. This action may be controlled as to speed by operation of the arm 28 to partially close the communication between the opening 25 and the passage 26, it being understood that this control of the speed is limited to rotation of the element 21 short of enough to unseat the poppet valve 15.

When the hoist has been elevated to the desired degree, the arm 28 is rotated to a point to unseat the poppet valve 15 whereupon fluid is permitted to flow from the passage 13 into the passage 16 and through the opening 25 and passage 26 back to the pump. The back pressure from the hoisting cylinder closes the ball check 18 immediately upon opening of the valve 15 so that the hoist is held in elevated position. The notch 29 is provided for return of a small amount of fluid to the pump during this phase of operation. This prevents blocking of the pump and, when the fluid is oil, prevents squeaking.

If now it is desired to lower the hoist, the arm 28 is rotated still farther until the projection 23 engages the ball 18 and opens communication between the passage portions 17 and 14 thereby permitting reverse flow of fluid from the hoisting cylinder past the two valve elements 18 and 15, into the passage 16, then back through the passage 24 to the other end of the hoisting cylinder. During this phase of operation the speed may be controlled by the degree of opening of the ball valve 18.

From the foregoing it will be obvious that I have provided a device which is well adapted for its intended purposes and while I have shown and described the same with particular reference to its use in connection with a dump truck or other hoisting device, and in connection with a particular embodiment shown in the accompanying drawing, I wish it understood that I am not limited to the details of the disclosure but only in accordance with the appended claims, mechanical equivalents of the elements of the claims being intended to be included in the scope thereof.

Having thus described my invention, what I claim is:

1. A valve construction adapted to control both the inlet and outlet of a fluid pump and comprising, in combination, means defining a first passage adapted to form a portion of a conduit connecting the pump output to a fluid pressure operated device, means defining a second passage adapted to form a portion of a return conduit from said fluid pressure operated device to the pump intake, a check valve in said first passage, a cut-off valve in said second passage, a communicating passage connecting said first and second passages, the communication with said first passage being on the pump-output side of said check valve, valve means controlling said communicating passage, and a single means for operating said last mentioned valve means and said check valve.

2. In the combination recited in claim 1, said single means comprising a rotor adapted to operate said cut-off valve between substantially fully open and substantially fully closed positions with both the other valves closed.

3. In the combination recited in claim 1, said single means being adapted to open said communicating passage in advance of the opening of said check valve.

4. In the combination recited in claim 1, said cut-off valve being constructed to remain open to at least a slight extent in all positions.

5. A valve construction adapted to control both the inlet and outlet of a fluid pump and comprising, in combination, means defining a first passage adapted to form a portion of a conduit connecting the pump output to a fluid pressure operated device, means defining a second passage adapted to form a portion of a return conduit from said fluid pressure operated device to the pump intake, a check valve in said first passage, a cut-off valve in said second passage, a communicating passage connecting said first and second passages, the communication with said first passage being on the pump-output side of said check valve, poppet valve means controlling said communicating passage, said cut-off valve including a rotor and means forming a part of said rotor for operating said poppet valve.

6. In the combination recited in claim 5, said poppet valve having a portion spaced from said check valve when both said poppet valve and said check valve are closed and adapted upon sufficient opening of said poppet valve to open said check valve.

RALPH A. GARVERICK.